P. WAGNER.
THRUST BEARING.
APPLICATION FILED MAY 3, 1911.
1,076,399.
Patented Oct. 21, 1913.
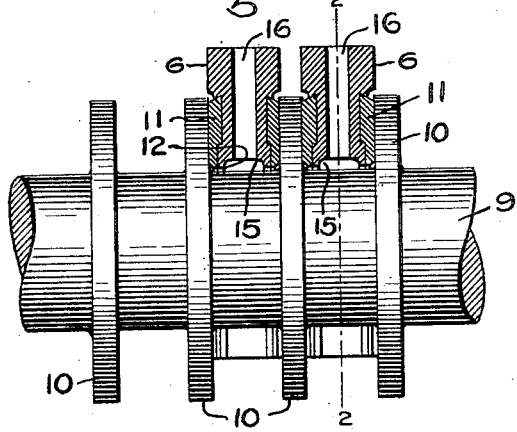
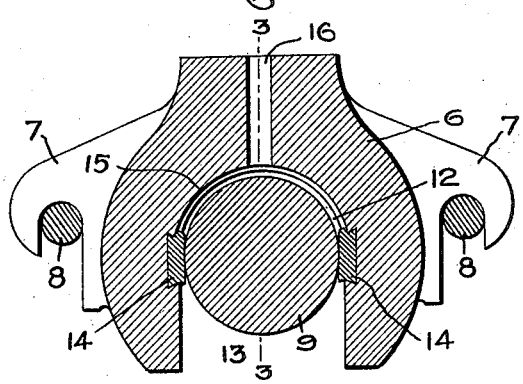
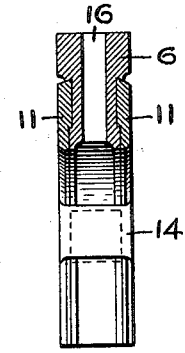
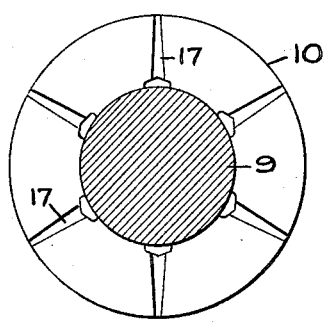
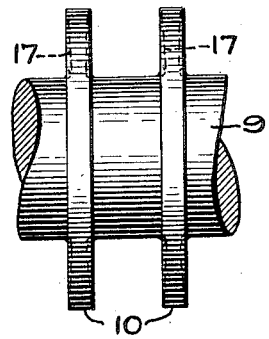
Witnesses:
Marcus L. Byng.
J. Ellis Glen
Inventor:
Paul Wagner,
by Albert G. Davis
His Attorney.

UNITED STATES PATENT OFFICE.

PAUL WAGNER, OF CHARLOTTENBURG, GERMANY, ASSIGNOR TO GENERAL ELECTRIC COMPANY, A CORPORATION OF NEW YORK.

THRUST-BEARING.

1,076,399.  Specification of Letters Patent.  Patented Oct. 21, 1913.

Application filed May 3, 1911. Serial No. 624,814.

*To all whom it may concern:*

Be it known that I, PAUL WAGNER, a subject of the King of Prussia, residing at Charlottenburg, Germany, have invented certain new and useful Improvements in Thrust-Bearings, of which the following is a specification.

This invention relates to thrust bearings having horseshoe-shaped thrust collars, or their equivalents, and the object of the invention is the provision of improved means for lubricating such bearings. In the ordinary bearing of this type effective lubrication is impossible because the open lower portions of the collars permit the lubricating oil to flow away quickly. In the improved bearing of the invention, effective lubrication is secured by the use of packing members that shut off a portion of the clearance space or gap between the collars and the shaft, thus forming a chamber into which oil can be forced under a suitable pressure and from which it is distributed over the pressure surfaces. This arrangement not only insures a copious supply of oil for lubrication but said supply also carries away the heat of friction, thus keeping the bearing cool and in effective operating condition.

In the drawing, which illustrates one of the embodiments of the invention, Figure 1 shows a portion of the shaft and two of the coöperating thrust collars, the latter being in section; Fig. 2 is a section of one of the thrust collars and the shaft on the line 2—2 of Fig. 1; Fig. 3 is a section of a thrust collar on the line 3—3 of Fig. 2; Fig. 4 is a transverse section of the shaft, also showing the oil grooves in the pressure surfaces of the shaft collars; and Fig. 5 is a side view of a portion of the shaft and its collars.

The horseshoe-shaped collars 6 have lateral projections 7 by means of which they are supported on the bolts 8 forming a part of the thrust bearing structure. The collars are secured in position on the bolts by means of nuts (not shown) in a well known manner. The shaft 9 is provided with collars 10 which are in lateral engagement with the collars 6 so that said collars 6 receive the thrust of the shaft and transmit it to the bearing structure and its support. The pressure surfaces of the collars 6 are preferably faced with suitable anti-friction metal 11. There is a clearance space 12 between the walls of the upper portions of the openings 13 in the collars 6 and the adjacent surfaces of the shaft. The lower ends of each clearance space are closed by packing members 14 which bear against the shaft at diametrically opposite points and thus form a chamber for lubricant extending substantially half way around the shaft. The members 14 as illustrated are formed of anti-friction metal and joined to the facings 11 of the collars 6. These lubricant chambers are preferably enlarged by the addition thereto of recesses 15 in the collars. The lubricant is supplied to the chamber through the passages 16 in the collars. It flows outwardly from the chambers through the distributing grooves 17 in the pressure surfaces of the collars 10, said grooves leading from the surface of the shaft 9 to the peripheries of the collars 10 and having their inner ends in communication with said chambers. These grooves, in conjunction with the relative rotation of the pressure surfaces, cause the lubricant to spread over said surfaces. An effective removal of the heat of friction can be secured by pumping cooled oil into the passages 16 at a pressure slightly above atmospheric pressure and forcing it in large quantities to the rubbing surfaces.

In the form of the invention illustrated, the packing members are inserted diametrically opposite each other on the inner sides of the thrust collars and are secured in position by dovetailing. Other arrangements can be adopted, and the chambers formed, for example, by shutting off the entire opening 13.

What I claim as new and desire to secure by Letters Patent of the United States, is,—

1. In a thrust bearing, the combination of a shaft having collars thereon, coöperating collars in lateral engagement with the first collars and having openings in one side to permit them to be assembled and removed, there being clearance spaces between the periphery of the shaft and the inner surfaces of the collars, means for supplying lubricant to the clearance spaces, and anti-friction metal facings that are secured to the second collars to form thrust surfaces and also packing members that engage the shaft and its collars to check the flow of lubricant from the clearance spaces into said opening.

2. In a thrust bearing, the combination of a shaft having collars thereon, horseshoe-shaped collars in lateral engagement with the first collars that are open on their lower sides to permit them to be assembled and removed, there being clearance spaces between the surface of the upper half of the shaft and the inner surfaces of the collars, and metallic packing members carried by the collars and arranged diametrically opposite each other at the ends of the clearance spaces, said members engaging the shaft and its collars and closing the ends of said spaces to check the flow of lubricant therefrom, there being passages in the collars for supplying lubricant to said spaces from which it flows outwardly over the thrust receiving surfaces.

3. In a thrust bearing, the combination of a shaft having collars thereon, horseshoe-shaped collars in lateral engagement with the first collars and open on their lower sides to permit them to be assembled and removed, there being clearance spaces between the surface of the upper half of the shaft and the inner surfaces of the collars, and packing members carried by the collars that are arranged diametrically opposite each other at the ends of the clearance spaces and engage the surface of the shaft to check the flow of lubricant from said spaces, said members extending across the inner surfaces of the collars and having their ends in engagement with the faces of the adjoining shaft collars, there being passages in the collars for supplying lubricant to the clearance spaces from which spaces it flows outwardly over the thrust receiving surfaces, and grooves in the faces of the shaft collars which lead outwardly from the surface of the shaft toward the peripheries of said collars, the inner ends of the grooves being in communication with the clearance spaces.

In witness whereof, I have hereunto set my hand.

PAUL WAGNER.

Witnesses:
  ERICK M. MERLÉE,
  GUSTAV HUBBROCK.

Copies of this patent may be obtained for five cents each, by addressing the "Commissioner of Patents, Washington, D. C."